United States Patent
Gao et al.

(10) Patent No.: US 8,893,519 B2
(45) Date of Patent: Nov. 25, 2014

(54) PROVIDING COOLING IN A MACHINING PROCESS USING A PLURALITY OF ACTIVATED COOLANT STREAMS

(75) Inventors: Yongsheng Gao, Hong Kong (CN); Shengyin Zhou, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 1312 days.

(21) Appl. No.: 12/633,419

(22) Filed: Dec. 8, 2009

(65) Prior Publication Data

US 2010/0150674 A1     Jun. 17, 2010

Related U.S. Application Data

(60) Provisional application No. 61/193,564, filed on Dec. 8, 2008.

(51) Int. Cl.
    *F25D 17/02*     (2006.01)
    *B23Q 11/10*     (2006.01)

(52) U.S. Cl.
    CPC ........................... *B23Q 11/10* (2013.01)
    USPC ........ 62/64; 62/304; 62/310; 62/311; 62/373; 451/7; 451/9; 451/449; 451/488; 451/450

(58) Field of Classification Search
    USPC .......... 62/64, 304, 310, 311, 373, 657; 451/7, 451/9, 449, 488, 450
    See application file for complete search history.

(56) References Cited

U.S. PATENT DOCUMENTS

| | | | | |
|---|---|---|---|---|
| 2,475,811 A | * | 7/1949 | Wagner et al. | 451/450 |
| 2,512,743 A | * | 6/1950 | Hansell | 134/34 |
| 2,772,540 A | * | 12/1956 | Vierkotter | 62/64 |
| 2,851,764 A | * | 9/1958 | White | 451/449 |
| 3,012,921 A | * | 12/1961 | Vaughan | 134/36 |
| 4,484,417 A | * | 11/1984 | Klingerman | 451/450 |
| 5,421,768 A | * | 6/1995 | Fujiwara et al. | 451/283 |
| 5,494,134 A | * | 2/1996 | McConkey | 184/6.14 |
| 5,578,529 A | * | 11/1996 | Mullins | 134/6 |
| 5,679,063 A | * | 10/1997 | Kimura et al. | 451/287 |
| 5,816,900 A | * | 10/1998 | Nagahara et al. | 451/285 |

(Continued)

FOREIGN PATENT DOCUMENTS

| | | |
|---|---|---|
| JP | 63-306862 A | 12/1998 |
| JP | 2004-351599 A | 12/2004 |

OTHER PUBLICATIONS

Gao et al., "An active coolant cooling system for applications in surface grinding," Appl. Therm. Eng., 23: 523-537 (2003).

(Continued)

*Primary Examiner* — Ljiljana Ciric
(74) *Attorney, Agent, or Firm* — Leydig, Voit & Mayer, Ltd.

(57) ABSTRACT

A cooling system and method for a machining process. The system includes a coolant supply and a coolant activation assembly, where the coolant supply is configured to provide coolant to the coolant activation assembly. The coolant activation assembly includes a plurality of piezoelectric actuators. Each of the plurality of piezoelectric actuators is configured to emit a coolant stream and to impart an ultrasonic or megasonic vibration component to each coolant stream. The coolant activation assembly is configured to provide cooling to a focal point in a work zone by directing multiple coolant streams emitted by the plurality of piezoelectric actuators to the focal point such that multiple coolant streams converge at the focal point.

13 Claims, 25 Drawing Sheets

(56) References Cited

U.S. PATENT DOCUMENTS

| | | | |
|---|---|---|---|
| 5,832,585 A * | 11/1998 | Takiar et al. | 451/53 |
| 5,833,523 A * | 11/1998 | Hykes | 451/450 |
| 6,006,736 A * | 12/1999 | Suzuki et al. | 125/13.02 |
| 6,083,084 A * | 7/2000 | Yokogawa et al. | 451/53 |
| 6,123,270 A * | 9/2000 | Hara | 451/450 |
| 6,139,406 A * | 10/2000 | Kennedy et al. | 451/67 |
| 6,283,840 B1 * | 9/2001 | Huey | 451/288 |
| 6,361,400 B2 * | 3/2002 | Southwick | 451/6 |
| 6,398,627 B1 * | 6/2002 | Chiou et al. | 451/72 |
| 6,429,131 B2 * | 8/2002 | Lin et al. | 438/691 |
| 6,508,944 B1 * | 1/2003 | Bratten | 210/805 |
| 6,544,111 B1 * | 4/2003 | Kimura et al. | 451/7 |
| 6,622,570 B1 * | 9/2003 | Prevey, III | 73/826 |
| 6,641,459 B2 * | 11/2003 | Ball | 451/5 |
| 6,723,626 B2 * | 4/2004 | Tsuchiya et al. | 438/597 |
| 6,874,344 B1 * | 4/2005 | Junius et al. | 72/38 |
| 6,908,370 B1 * | 6/2005 | Jiang et al. | 451/60 |
| 6,938,633 B2 * | 9/2005 | Sugata et al. | 137/1 |
| 7,014,552 B1 * | 3/2006 | Collier et al. | 452/56 |
| 7,021,999 B2 * | 4/2006 | Jiang et al. | 451/60 |
| 7,086,933 B2 * | 8/2006 | Vereen et al. | 451/36 |
| 7,108,588 B1 * | 9/2006 | Guthrie et al. | 451/60 |
| 7,153,189 B2 | 12/2006 | Morita et al. | |
| 7,210,989 B2 * | 5/2007 | Joslyn | 451/60 |
| 7,281,535 B2 * | 10/2007 | Mihai et al. | 125/13.01 |
| 7,297,047 B2 * | 11/2007 | Lee et al. | 451/5 |
| 7,376,482 B2 | 5/2008 | Ido | |
| 7,377,836 B1 * | 5/2008 | Molnar | 451/5 |
| 7,481,696 B2 | 1/2009 | Mukai et al. | |
| 7,513,121 B2 * | 4/2009 | Zurecki et al. | 62/64 |
| 7,530,882 B2 | 5/2009 | Soma et al. | |
| 7,566,347 B2 * | 7/2009 | Racette et al. | 134/26 |
| 7,572,175 B2 | 8/2009 | Ido | |
| 7,615,259 B2 * | 11/2009 | Nishikawa | 134/19 |
| 7,632,169 B2 * | 12/2009 | Fujita | 451/41 |
| 7,707,841 B2 * | 5/2010 | Turner, Jr. | 62/64 |
| 7,708,622 B2 * | 5/2010 | Ramarajan | 451/56 |
| 7,980,922 B2 * | 7/2011 | Kiesel et al. | 451/5 |
| 7,997,958 B2 * | 8/2011 | Ramarajan | 451/56 |
| 8,414,357 B2 * | 4/2013 | Wang et al. | 451/41 |
| 8,429,831 B2 * | 4/2013 | Gillick et al. | 34/78 |
| 8,439,723 B2 * | 5/2013 | Marks et al. | 451/7 |
| 8,449,356 B1 * | 5/2013 | Sae-Lee | 451/450 |
| 8,622,783 B2 * | 1/2014 | Kiesel et al. | 451/8 |
| 2002/0170574 A1 * | 11/2002 | Quarantello | 134/6 |
| 2003/0143927 A1 * | 7/2003 | Joslyn | 451/7 |
| 2003/0199229 A1 * | 10/2003 | Vereen et al. | 451/36 |
| 2004/0101415 A1 * | 5/2004 | Schoeb | 417/53 |
| 2004/0232258 A1 * | 11/2004 | Cerv et al. | 239/407 |
| 2005/0011201 A1 * | 1/2005 | Zurecki et al. | 62/64 |
| 2005/0211029 A1 * | 9/2005 | Zurecki et al. | 239/128 |
| 2005/0268899 A1 * | 12/2005 | Mihia et al. | 125/13.01 |
| 2007/0175255 A1 * | 8/2007 | Pawelski et al. | 72/201 |
| 2007/0175304 A1 * | 8/2007 | In't Veld et al. | 83/169 |
| 2008/0182487 A1 | 7/2008 | Müller et al. | |
| 2011/0114125 A1 * | 5/2011 | Chen et al. | 134/18 |
| 2011/0220147 A1 * | 9/2011 | Schreiber et al. | 134/15 |

OTHER PUBLICATIONS

Gao et al., "Effects of actively cooled coolant for grinding brittle materials," Key Eng. Mater., 291-292: 233-238 (2005).

Gao et al., "Effects of actively cooled coolant for grinding ductile materials," Key Eng. Mater., 339: 427-433 (2007).

Gao et al., "Use of actively cooled and activated coolant for surface quality improvement in ductile material grinding," Int. J. Mater. Prod. Technol., 31 (1): 14-26 (2008).

Gao et al., "Actively cooled and activated coolant for grinding brittle materials," Key Eng. Mater., 389-390: 338-343 (2009).

Suzuki et al., "Grinding performance improvement by a special coolant superimposed with the megasonic vibration," Key Eng. Mater., 238-239: 183-188 (2003).

Suzuki et al., "Effects of the megasonic floating nozzle on grinding performance for hard materials," Key Eng. Mater., 257-258: 311-314 (2004).

* cited by examiner

Effects of number of beams $n_a$ on vibration amplitude $A$

Standard deviation of *I* for all workpieces in Fig. 8

Standard deviation of surface roughness $R_a$ for all workpieces in Fig. 9

Range of surface roughness $R_a$ for all workpieces in Fig. 9

Plot of main effects for surface roughness

Plot of interaction for surface roughness

Effects of coolant temperature $t_c$ on $I$ based on Table 5

Effects of number of actuator $n_a$ on $I$ based on Table 6

Effects of coolant temperature $t_c$ on surface roughness $R_a$ based on Table 7

Effects of number of beams $n_a$ on surface roughness $R_a$ based on Table 8

| | Table 1 Experimental conditions |
|---|---|
| Active cooler array | Maximum coolant volume: $V_c$=40l |
| Ultrasonic coolant nozzle system | Actuating frequency: $f$=1.7MHz<br>Number of actuator: $n_a$=1,2,...,$N_a$; $N_a$=5 |
| Grinding system conditions | Workpiece: stainless steel 32mm x 22mm x 1mm<br>Grinding wheel: SiC T1A GC100M6VG 7x1/4x1.1/4"<br>Grinding machine: ESG-818ASD<br>Grinding pass number $n_g$: $n_g$= 0, 1,..., $N_g$, $N_g$=200<br>Wheel infeed position $u_{wn}$: $u_{wn}=ku_0$, $k$= 1, 2,..., 10, for every 19 sparking passes, $u_0=d_c$<br>Dressing wheel speed: $n_s$=3200rpm |
| Grinding process conditions for preliminary test | Wheel speed: $n_s$=2400rpm<br>Workpiece table speed: $v_w$=100mm/s<br>Depth of cut $d_c$:=3μm<br>Coolant temperature: $t_c$=4,20°C<br>Coolant flow rate: $Q_c$=60-160l/h<br>Grinding fluid: $c_c$=5% soluble type<br>Number of actuator: $n_a$=1,3,5 |
| Grinding process conditions for factorial orthogonal test | Wheel speed: $n_s$=2000,2400rpm<br>Workpiece table speed: $v_w$=100mm/s<br>Depth of cut $d_c$:=1,3μm<br>Coolant temperature: $t_c$=4,20°C<br>Coolant flow rate: $Q_c$=160l/h<br>Grinding fluid: $c_c$=5% soluble type<br>Number of actuator: $n_a$=1,5 |
| Grinding process conditions for $t_c$ and $n_a$ test | Wheel speed: $n_s$=2200rpm<br>Workpiece table speed: $v_w$=100mm/s<br>Depth of cut $d_c$:=2μm<br>Coolant temperature: $t_c$=4~20°C<br>Coolant flow rate: $Q_c$=160l/h<br>Grinding fluid: $c_c$=5% soluble type<br>Number of actuator: $n_a$=1,2,...,$N_a$, $N_a$=5 |
| Coolant conditions | Normal coolant $t_c=T_\infty$, $T_\infty$ represents room temperature<br>Activated coolant $t_c= T_\infty$<br>Cooled coolant $t_c$=4°C - $T_\infty$<br>Actively cooled and activated coolant $t_c$=4°C-$T_\infty$ |

FIGURE 19

| Table 2 Measurement conditions | |
|---|---|
| PCB Piezo sensor 350A13 SN 14091 | Sensitivity : 0.526 mV/g 0.054 mV/m/s$^2$ |
| Digital Storage Oscilloscope Tektronix 2212 60MHz | Vertical Division: 10mV DC Storage on |
| Current probe amplifier AM503B | Current/Division: 500mA Coupling: AC |
| Optical profiler Wyko NT3000 | Resolution: Full Mode: VSI Objective: 5x FOV: x1 Back scan: 5μm Scan length: 15μm Modulation threshold: 5% Scan speed: 1x Digital high pass filter: 15/mm Field of view: 1.24×0.94mm |
| Optical microscope BH2-UMA | Magnification: 1000× |
| Scanning electron microscope JSM 6300F | Magnification: 5000×, 10000× Accelerate voltage: 15kV Spot size: 40 |
| Roughness data processing | Grinding tests: 2 Measurement spots per test sample: 5 Number of data for average: 10 |

FIGURE 20

Table 3  Effect estimate summary

| Factor | Effect estimate | Sum of squares | Percent contribution |
|---|---|---|---|
| Coolant temperature $t_c$ (A) | 8.442 | 285.27 | 30.95 |
| Wheel speed $n_s$ (B) | -3.165 | 40.06 | 4.35 |
| Depth of cut $d_c$ (C) | 4.910 | 96.44 | 10.46 |
| Number of beams $n_a$ (D) | -5.070 | 102.82 | 11.16 |
| AB/CD | 2.636 | 27.8 | 3.02 |
| AC/BD | 5.038 | 101.52 | 11.02 |
| AD/BC | 4.229 | 71.54 | 7.76 |
| Pure error | | 292.48 | |
| Total | | 921.51 | |

FIGURE 21

Table 4  Analysis of variance for surface roughness

| Source of variation | Sum of squares | Degrees of freedom | Mean square | $F_0$ | $F_{0.25}$ | $F_{0.10}$ |
|---|---|---|---|---|---|---|
| Coolant temperature $t_c$ (A) | 285.27 | 1 | 285.27 | 7.8** | 1.54 | 3.46 |
| Wheel speed $n_s$ (B) | 40.06 | 1 | 40.06 | 1.096 | 1.54 | 3.46 |
| Depth of cut $d_c$ (C) | 96.44 | 1 | 96.44 | 2.63* | 1.54 | 3.46 |
| Number of beams $n_a$ (D) | 102.82 | 1 | 102.82 | 2.81* | 1.54 | 3.46 |
| AB/CD | 27.8 | 1 | 27.8 | 0.74 | 1.54 | 3.46 |
| AC/BD | 101.52 | 1 | 101.52 | 2.78* | 1.54 | 3.46 |
| AD/BC | 71.54 | 1 | 71.54 | 1.96 | 1.54 | 3.46 |
| Error | 292.48 | 8 | 36.56 | | | |
| Total | 921.51 | 15 | | | | |

* Significant factors. ** Very significant factors. $F_{0.25}(1,8)=1.54$; $F_{0.10}(1,8)=3.46$.

FIGURE 22

Table 5  Effects of $t_c$ on $I$

| $t_c$(°C) | Number of coolant beams $n_a$ | | | | | |
| | 5 | 4 | 3 | 2 | 1 | 0 |
|---|---|---|---|---|---|---|
| 4 | 1.6553 | 1.6458 | 1.5940 | 1.6298 | 1.6144 | 1.6388 |
| 8 | 1.6056 | 1.5985 | 1.6803 | 1.6608 | 1.7370 | 1.7928 |
| 12 | 1.6319 | 1.4620 | 1.5571 | 1.5544 | 1.5630 | 1.5140 |
| 16 | 1.4593 | 1.3950 | 1.4300 | 1.4348 | 1.6278 | 1.6900 |
| 22 | 1.3133 | 1.3553 | 1.3695 | 1.4051 | 1.4545 | 1.5477 |
| $t_c$: 4→22°C | -20.66% | -17.65% | -14.08% | -13.79% | -9.91% | -5.56% |

FIGURE 23

Table 6  Effects of $n_a$ on $I$

| $n_a$ | Coolant temperature $t_c$ (°C) | | | | |
|---|---|---|---|---|---|
| | 22 | 16 | 12 | 8 | 4 |
| 0 | 1.5477 | 1.6900 | 1.5140 | 1.7928 | 1.6388 |
| 1 | 1.4545 | 1.6278 | 1.5630 | 1.7370 | 1.6144 |
| 2 | 1.4051 | 1.4348 | 1.5544 | 1.6608 | 1.6298 |
| 3 | 1.3695 | 1.4300 | 1.5571 | 1.6803 | 1.5940 |
| 4 | 1.3553 | 1.3950 | 1.4620 | 1.5985 | 1.6458 |
| 5 | 1.3133 | 1.4593 | 1.6319 | 1.6056 | 1.6553 |
| $n_a$: 1→5 | -9.70% | -10.35% | 4.41% | -7.56% | 2.53% |

FIGURE 24

Table 7  Effects of $t_c$ on $R_a$

| $t_c$(°C) | Number of coolant beams $n_a$ | | | | | |
|---|---|---|---|---|---|---|
| | 5 | 4 | 3 | 2 | 1 | 0 |
| 4 | 136.534 | 143.613 | 141.144 | 147.040 | 151.633 | 149.440 |
| 8 | 137.467 | 144.819 | 154.360 | 150.557 | 156.736 | 159.319 |
| 12 | 155.311 | 152.436 | 157.433 | 158.407 | 162.323 | 164.272 |
| 16 | 160.275 | 169.657 | 171.463 | 162.906 | 166.084 | 174.440 |
| 22 | 165.036 | 167.346 | 172.254 | 170.236 | 177.437 | 182.066 |
| $t_c$: 4→22°C | 20.88% | 16.53% | 22.04% | 15.78% | 17.02% | 21.83% |

FIGURE 25

Table 8  Effects of $n_a$ on $R_a$

| $n_a$ | Coolant temperature $t_c$ (°C) | | | | |
|---|---|---|---|---|---|
| | 22 | 16 | 12 | 8 | 4 |
| 0 | 182.066 | 174.440 | 164.272 | 159.319 | 149.440 |
| 1 | 177.437 | 166.084 | 162.323 | 156.736 | 151.633 |
| 2 | 170.236 | 162.906 | 158.407 | 150.557 | 147.040 |
| 3 | 172.254 | 171.463 | 157.433 | 154.360 | 141.144 |
| 4 | 167.346 | 169.657 | 152.436 | 144.819 | 143.613 |
| 5 | 165.036 | 160.275 | 155.311 | 137.467 | 136.534 |
| $n_a$: 1→5 | -6.99% | -3.50% | -4.32% | -12.30% | -9.96% |

FIGURE 26

Table 9  Rate of variation for $R_a$ against coolant temperature $R_a'(t_c)$

| $t_c(°C)$ | Number of coolant beams $n_a$ | | | | | |
|---|---|---|---|---|---|---|
| | 5 | 4 | 3 | 2 | 1 | 0 |
| 4~8 | 0.233 | 0.301 | 3.304 | 0.879 | 1.276 | 2.470 |
| 8~12 | 4.461 | 1.904 | 0.768 | 1.962 | 1.397 | 1.238 |
| 12~16 | 1.241 | 4.305 | 3.508 | 1.125 | 0.940 | 2.542 |
| 16~22 | 0.794 | -0.385 | 0.132 | 1.222 | 1.892 | 1.271 |

FIGURE 27

Table 10 Rate of variation for $R_a$ against number of coolant beams $R_a'(n_a)$

| $n_a$ | Coolant temperature $t_c$ | | | | |
|---|---|---|---|---|---|
| | 22 | 16 | 12 | 8 | 4 |
| 0~1 | -4.629 | -8.356 | -1.949 | -2.583 | 2.193 |
| 1~2 | -7.201 | -3.178 | -3.916 | -6.179 | -4.593 |
| 2~3 | 2.018 | 8.557 | -0.974 | 3.803 | -5.896 |
| 3~4 | -4.908 | -1.806 | -4.997 | -9.541 | 2.469 |
| 4~5 | -2.310 | -9.382 | 2.875 | -7.352 | -7.079 |

FIGURE 28

PROVIDING COOLING IN A MACHINING PROCESS USING A PLURALITY OF ACTIVATED COOLANT STREAMS

CROSS-REFERENCE TO RELATED APPLICATIONS

This patent application claims the benefit of U.S. Provisional Patent Application No. 61/193,564, filed Dec. 8, 2008, which is incorporated by reference in its entirety.

TECHNICAL FIELD

This invention is related in general to the field of machining and in particular to a system for providing cooling in a machining or chemical process that requires cooling.

BACKGROUND OF THE INVENTION

As the most important manufacturing process in modern industry, machining is defined as the process of removing material from a workpiece in the form of chips. To perform the machining operation, relative motion is introduced between the tool and the workpiece. This relative motion is achieved in most machining operations by means of a primary motion, called cutting speed and a secondary motion, called feed. The shape of the tool and its penetration into the workpiece surface, combined with these motions, produce the desired shape of the resulting workpiece surface.

Common machining operations, such as drilling, turning, milling, and grinding, are capable of generating certain part geometries and surface textures. For example, the turning operation uses a cutting tool to remove material from a rotating workpiece to generate a cylindrical shape. As another example, grinding, which is the most precision machining process, generates smooth surfaces and fine tolerances.

In particular, grinding involves removing materials by creating a contact between a grinding wheel and a workpiece. Each grain of the grinding wheel removes a chip from the surface of the workpiece material and generates a surface finish. Material removal is done by individual grains whose cutting edge is bounded by force and path. The initial cutting interface is characterized by elastic deformation, followed by plastic flow of workpiece material. As discussed in J. Kopac and P. Krajnik, "High-performance grinding—A review," Journal of Materials Processing Technology, Vol. 175, No. 1-3, pp. 278-284, 2006, which is hereby incorporated by reference, penetration between two hard materials influences the kinematics and contact condition.

A major limiting factor in any machining process is thermal damage caused by heat. In a machining process, energy is converted to heat, which is concentrated within the cutting zone. The high temperature produced can cause various types of thermal damage to the workpiece, such as burning, phase transformation, softening of the surface layer with possible rehardening, unfavorable residual tensile stresses, cracks, and reduced fatigue strength. To some extent, heat can also increase tool wear and reduce tool life.

Heat damage can be reduced by applying cooling fluid, also known as coolant, to remove the heat created by the interaction between the workpiece and the cutting tool and to lubricate the surfaces between them to reduce the amount of friction in the cutting zone. Because the coolant removes heat by way of conduction, the colder the fluid, the more effective the heat transfer. The fluid is also used to flush away chips. In addition, when the cutting fluid is applied to the cutting zone, it will initially undergo nucleate boiling. This process enhances the rate of heat transfer between the workpiece and the fluid.

There are four categories of cutting fluids based on composition, as suggested in K. Blenkowski, "Coolants and lubricants: part 1—the truth," Manufacturing Engineering, pp. 90-96, 1993 and J. A. Webster and C. Cui, R. B. Mindek, "Grinding fluid application system design," CIRP Annuals, Vol. 44, No. 1, pp. 333-338, 1995, both of which are hereby incorporated by reference for everything they describe. The publication by P. Q. Ge, L. Wang, Z. Y. Luan, and Z. C. Liu, "Study on service performance evaluation of grinding coolants," Key Engineering Materials, Vol. 258-259, pp. 221-224, 2004, further shows that no fluid is perfect for all aspects of machining processes. This Ge et al. publication is also incorporated by reference for everything it describes. The significances of cooling, grinding forces, and thermal behavior have also been studied. In particular, it has been shown that water-based emulsions have better cooling effect, but generally lead to higher grinding forces.

Surface profile and roughness of a machined workpiece are two of the most important product quality characteristics and in most cases a technical requirement for mechanical products. Achieving the desired surface quality is of great importance for the functional behavior of a workpiece. Surface quality of a workpiece is generally indicated by surface roughness, surface physical and chemical performance, surface fluctuation, surface hardness, and residual stress.

Beyond machining processes, many mechanical or chemical systems also generate a significant amount of heat during their operations, due to frictions between components, combustions, or chemical reactions in the working zone. Cooling by way of cooling media or coolant such as gas or fluid is often needed to minimize thermal damage and maintain normal system performance in these systems.

Conventional cooling methods for reducing thermal damages include cryogenic cooling, spray cooling, air cooling, active cooling, megasonic cooling, actively cooled and activated cooling. The limitations of these conventional cooling methods are discussed below.

Cryogenic cooling utilizes a jet of liquefied gas such as liquid nitrogen. In this method, cooling is realized through a very high temperature gradient generated by contrast between the high temperature in the working zone and the very low temperature of the liquid nitrogen. The method has been shown to be effective in grinding ductile materials. However, for brittle materials, the very high temperature gradient may present a problem due to the possibilities in generating excessive thermal stresses on the surfaces of brittle materials. In addition, the method requires frequent replenishment of liquid nitrogen, which is uneconomical for long term use and requires great care for safety.

Spray cooling is a frequently used method of heat removal in many machining processes. However, it is not practical in precision machining processes.

In the air cooling method, the temperature is typically reduced to −10° C. ~60° C. The temperature gradient is still quite large. However, in terms of specific heat and thermal conductivity, the physical properties of chilled air are more unfavorable than those of water based coolant. The delivery speed is generally up to 100 m/s, which is approximately 40-200 times of the one for water-based coolant, thereby causing a high level of noise.

In the active cooling method, an active cooling system is utilized to reduce the machining temperatures in the cutting zone through force convection. The active cooling system includes a coolant tank connected to an evaporator of the heat pump for heat exchange to remove the machining heat so as to reduce temperature in the working zone.

In ultrasonic or megasonic cooling, a floating nozzle having an integrated ultrasonic or megasonic transducer is utilized to provide coolant to cool the cutting zone. The surface quality improvement in the ultrasonic and megasonic cooling is attributed to the fluid cavitation effect. For example, previous studies have shown that megasonic cooling allows an increase in the grinding ratio by about 2 times and an improvement in the surface roughness by 20 to 30%. The temperature gradient mechanism was not utilized and as such cooling effectiveness improvement was limited.

In an actively cooled and activated coolant method, the cooling mist generated through a high frequency activation is able to take away heat from the cutting zone by way of evaporation effect. It has been shown that the actively cooled and activated cooling can achieve a 22.9% of average surface quality improvement in depth of cut tests and a 23.77% of average surface quality improvement in table speed tests. In these tests, an average improvement up to 36.68% in roughness value (Ra) has been obtained.

However, these conventional cooling methods are often insufficient to provide cooling necessary for producing high-quality workpieces. In particular, in conventional ultrasonic and megasonic cooling, there is a technical limitation in the piezoelectric activation component which imparts an upper limit in the activation strength, thereby limiting the cooling effect. In addition, it is also desired for a cooling system to have the capability to adjust the strength of cooling provided to the working or cutting zone so that the cooling effect is optimized for a given process.

BRIEF SUMMARY OF THE INVENTION

Described herein is a system for providing cooling in a machining process or a system that generates heat. Unlike conventional systems that provide a limited cooling effect, various embodiments of this system can provide an adjustable cooling strength by generating multiple activated cooling medium streams. In these embodiments, the coolant are cooled by an active cooling system and activated by an actuator assembly. These coolant streams, which can be controlled individually, are arranged to form a focal point to produce an enhanced cooling effect.

One objective of the system is to provide an effective way to significantly cool a working zone and improve workpiece quality at low cost without using expensive system components.

Still another objective of the system is to provide adjustable cooling that can be optimized for the conditions and requirements of a machining process or a system.

According to some embodiments, a system is provided for cooling a machining process. The system includes a coolant supply for providing a coolant flow, and an actuator assembly for receiving the coolant flow and forming a plurality of coolant streams for cooling a cutting zone, where the plurality of coolant streams faun a focal point.

According to other embodiments, a method is provided for cooling a cutting zone in a machining process. The method includes receiving a coolant flow from a coolant supply, and generating a plurality of coolant streams from the received coolant flow, wherein the plurality of coolant streams form a focal point within the cutting zone.

According to still other embodiments, an actuator assembly is provided for cooling a cutting zone in a machining process. The actuator assembly includes at least one coolant inlet for receiving coolant from a coolant supply, and a plurality of coolant outlets, where each of the plurality of coolant outlets generates a coolant stream and the plurality of coolant streams form a focal point.

One application of the system described herein is for providing enhanced cooling in a machining process such as a grinding operation. In this respect, multiple cooled activation medium streams are arranged to point to a focal point in the grinding zone to increase the cooling strength. The activation causes evaporation that takes away the heat from the working zone. This, together with the active cooling, provides a better machining condition so that better surface quality can be achieved on the workpiece.

The system can also be used in many other mechanical or chemical processes as long as a cooling medium is used in the processes.

BRIEF DESCRIPTION OF THE SEVERAL VIEWS OF THE DRAWING(S)

FIG. 19 depicts Table 1, showing the experimental conditions of the experiments in FIGS. 4 and 5;

FIG. 20 depicts Table 2, showing the measurement conditions of the experiments in FIGS. 4 and 5;

FIG. 21 depicts Table 3, showing a summary of the data collected during the experiments in FIGS. 4 and 5;

FIG. 22 depicts Table 4, showing the surface roughness of measured in the experiment in FIG. 5;

FIG. 23 depicts Table 5, showing the effects of the coolant temperature $t_c$ on the loading current I;

FIG. 24 depicts Table 6, showing the effects of the number of coolant streams $n_a$ on the loading current I;

FIG. 25 depicts Table 7, showing the effect of $t_c$ on the surface roughness $R_a$;

FIG. 26 depicts Table 8, showing the effect of $n_a$ on $R_a$;

FIG. 27 depicts Table 9, showing the rate of variation for $R_a$ against the coolant temperature, $R_a'(t_c)$; and FIG. 28 depicts Table 10, showing the rate of variation for $R_a$ against the number of coolant streams, $R_a'(n_a)$.

DETAILED DESCRIPTION OF THE INVENTION

Figure 1:
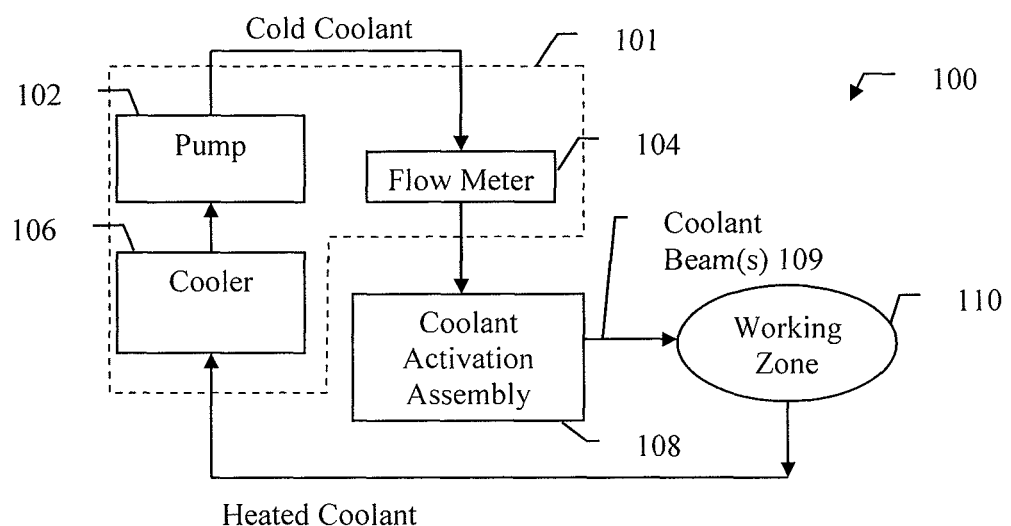
FIG. 1 depicts a diagram illustrating a system for providing cooling in a machining process, including an actuator assembly and a coolant supply.

Now turning to the drawings, depicted in FIG. 1 is an embodiment of a system 100 for providing enhanced cooling in a machining process. As shown in the figure, system 100 includes a coolant supply 101 and a coolant activation assembly 108 that draws cold coolant from the coolant supply 101. The coolant activation assembly 108 generates a plurality of coolant streams 109, which is applied to a working zone 110 so that the heat generated within the working zone 110 is taken away by the coolant. The heated coolant, which absorbs and carries away the heat, is returned to the coolant supply 101, which cools and circulates the coolant back to the coolant activation assembly 108. As discussed above, the coolant can be gas or fluid as used in any existing cooling system.

The coolant supply 101 further includes a cooler 106 for cooling the heated coolant, a pump 102 for driving the coolant through the cooler 106 to form a coolant flow and deliver the cold coolant flow to the coolant activation assembly 108, and a flow meter 104 for monitoring the coolant flow supplied to the coolant activation assembly 108. In particular, the cooler 106 usually takes the form of a heat exchanger that cool the coolant coming from the working zone 110.

According to a further embodiment, the working zone 110 includes a cutting area in a machining process such as grinding or drilling. In this embodiment, heat is generated within the working zone 110 due to frictions between a workpiece and a cutting tool such as a grinding wheel or a drill bit. Alternatively, the working zone 110 includes other mechanical or chemical processes that require cooling.

The coolant activation assembly 108 includes one or more actuators for generating activated coolant streams 109. Each of the actuators includes a piezoelectric component for imparting a vibration component to the coolant streams 109 for providing enhanced cooling to the working zone 110.

Figure 2A:
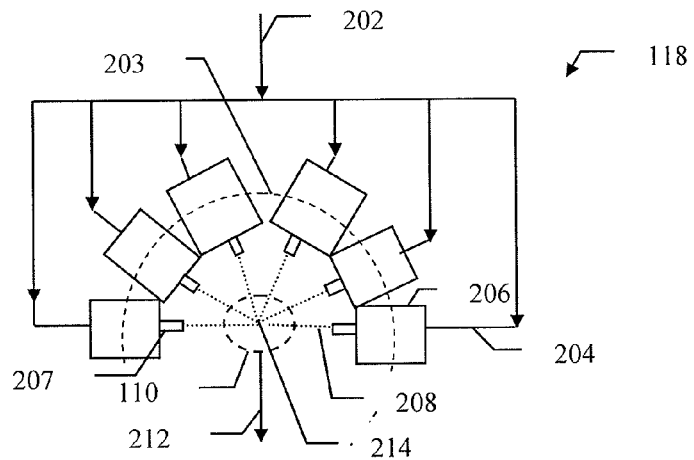
FIG. 2A depicts one embodiment of an actuator assembly in FIG. 1 for generating a plurality of coolant streams converging at a focal point.

FIG. 2A depicts one embodiment of the coolant activation assembly 108, where six actuators 206 are arranged along an arch 203 such that the coolant streams 208 generated by these actuators converge at a focal point 214 within the working zone 110. Each of the actuator 206 is oriented such that the coolant outlet 207 of the actuator is pointing toward the focal point 214. As shown in FIG. 2A, each actuator 206 also has a coolant inlet 204 for receiving coolant from the incoming cold coolant flow 202 coming from the coolant supply 101. The heated coolant that flows through the working zone is collected to form a heated coolant flow 212, which is returned to the coolant supply 101.

As discussed above, each actuator 206 in FIG. 2A has an integrated activation element such as a piezoelectric element for generating an ultrasonic or megasonic vibration component in the coolant stream 208.

The actuator 206 for generating activated coolant stream is conventional and well known in the art. For example, the actuator 206 can take the form of a coolant nozzle described by K. Suzuki et al. "Grinding performance improvement by a special coolant superimposed with the megasonic vibration," Key Engineering Materials, Vol. 238-239, pp. 183-188, 2003, and K. Suzuke, et al. "Effects of megasonic floating nozzle on grinding performance for hard materials," Key Engineering Materials, Vol. 257-258, pp. 311-314, 2004, all of which are hereby incorporated by reference in their entireties and for everything they describe. As descried in these literatures, as the coolant enters the actuator 206 and contacts the piezoelectric component in the actuator 206, the piezoelectric component imparts an ultrasonic vibration to the cutting fluid passing through the actuator, thereby resulting additional energy added to the coolant stream output from the coolant outlet 207.

Alternatively, the technique described in Y. Gao et al. "Spatial distribution of cooling mist for precision grinding," Key Engineering Materials, Vol. 389-390, pp. 344-349, 2009, which is hereby incorporated by reference in its entirety and for everything it describes, can also be used to generated the activated coolant streams 208 with an ultrasonic or megasonic vibration component. In this literature, due to high frequency vibration, mist is generated with in the work zone after an activated coolant stream touches the wheel or workpiece surface. As a result, heat transfer is enhanced through the activation.

Figure 2B:
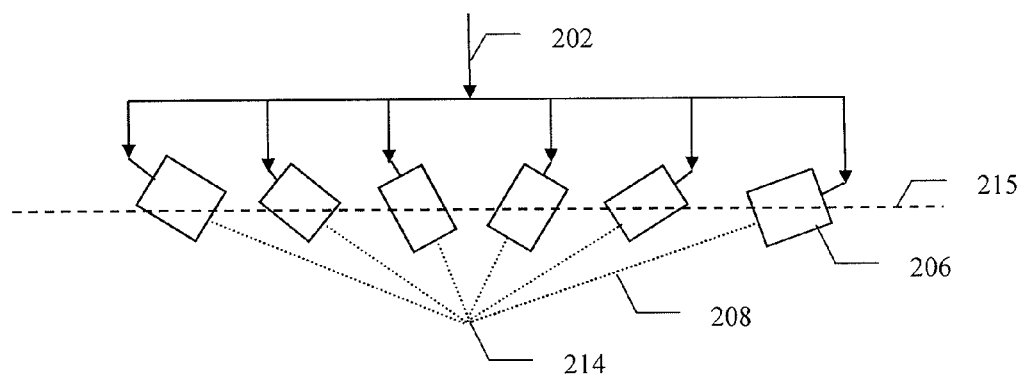
FIG. 2B depicts another embodiment of the actuator assembly in FIG. 1 for generating a plurality of coolant streams converging at a focal point.
Figure 2C:
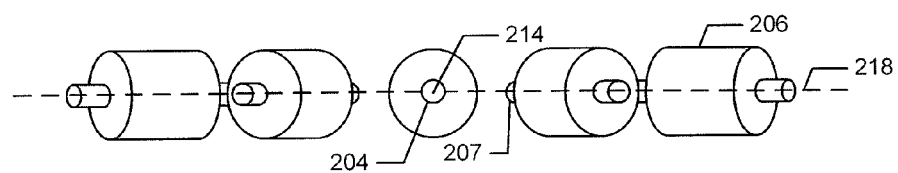
FIG. 2C depicts one embodiment of the actuator assembly in FIG. 1 where the coolant streams are formed within a horizontal plane.
Figure 2D:
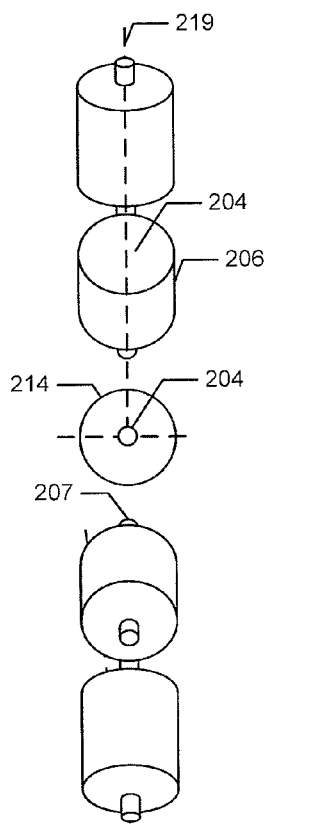
FIG. 2D depicts another embodiment of the actuator assembly in FIG. 1 where the coolant streams are formed within a vertical plane.
Figure 2E:
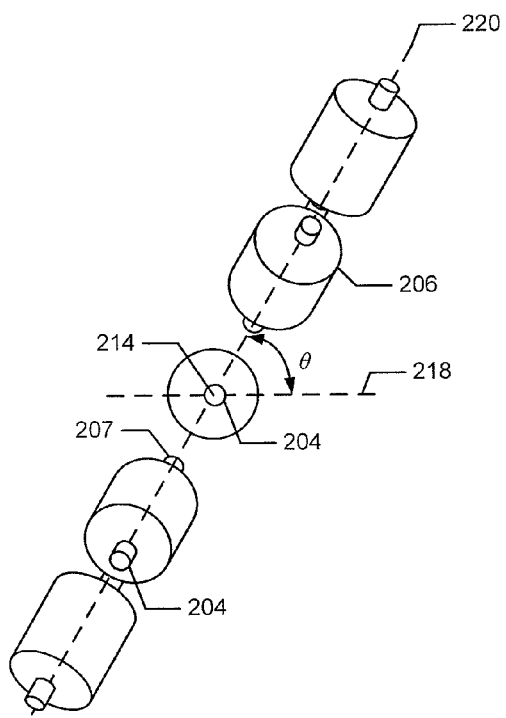
FIG. 2E depicts still another embodiment of the actuator assembly in FIG. 1 where the coolant streams are formed within a plane that is at an angle from the horizontal position.
Figure 2F:
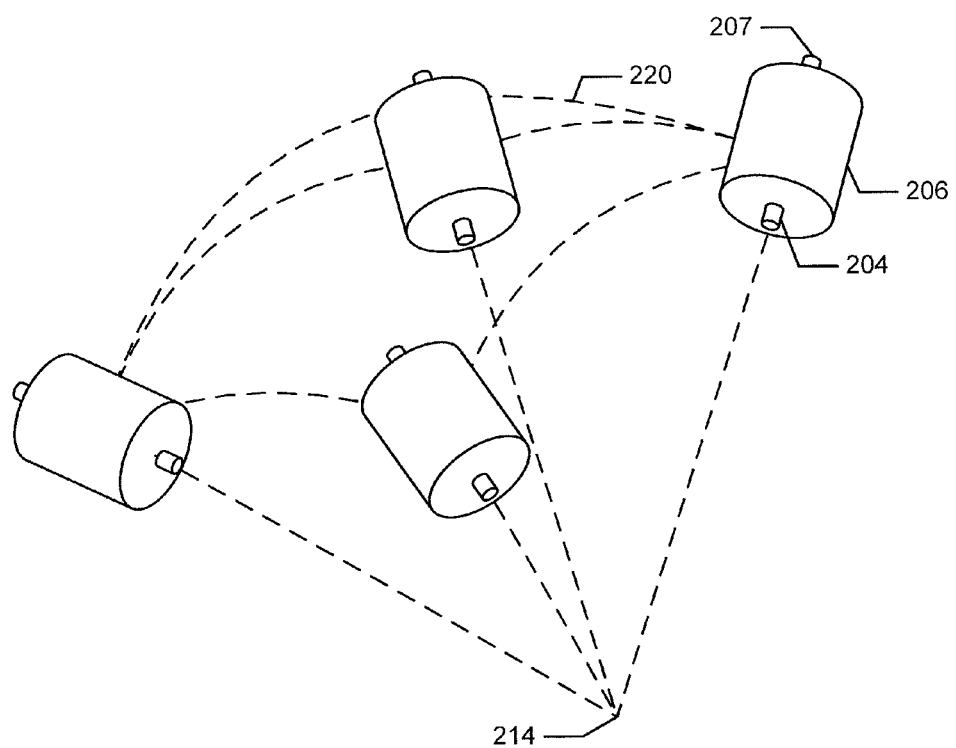
FIG. 2F depicts still another embodiment of the actuator assembly in FIG. 1 where the plurality of actuators are positioned on a spherical surface.
Figure 2G:
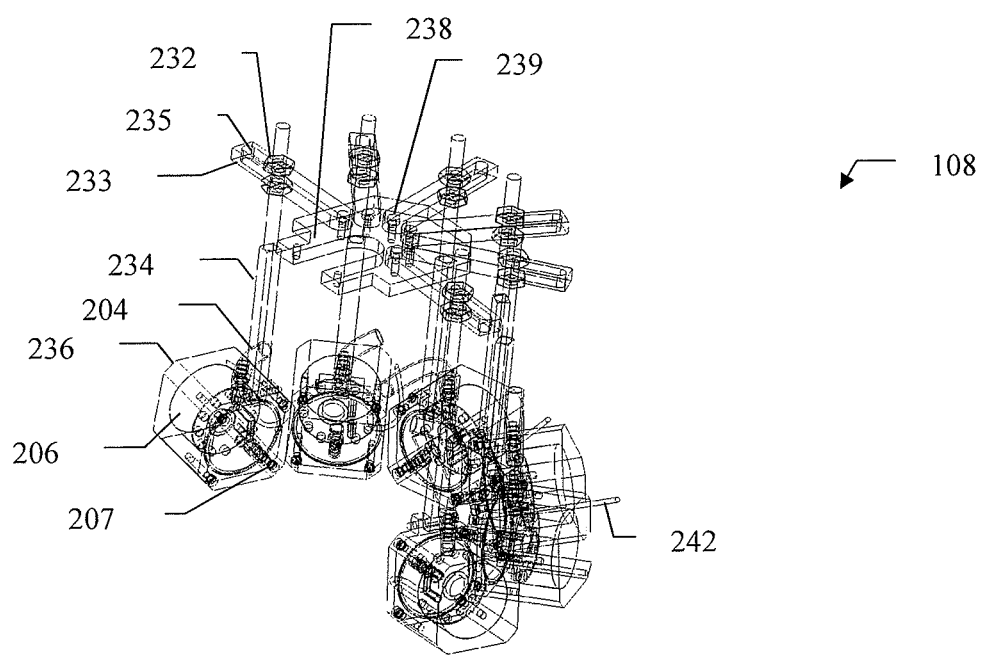
FIG. 2G depicts one embodiment of the actuator assembly having a plurality of actuators and supporting components.
Figure 2H:
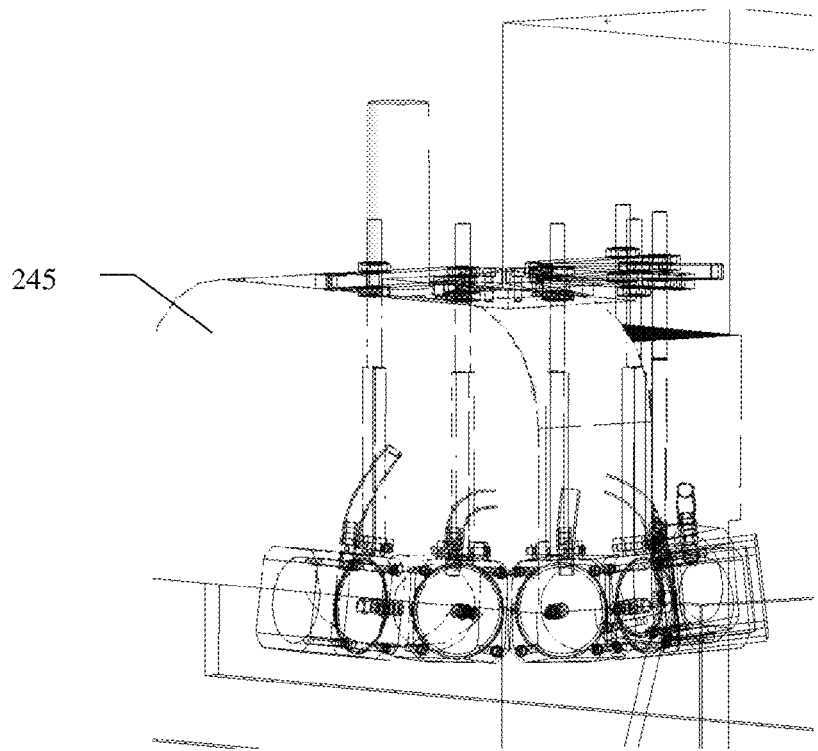
FIG. 2H depicts an actuator assembly in FIG. 2G in its installation position with respect to a grinding machine.
Figure 2I:
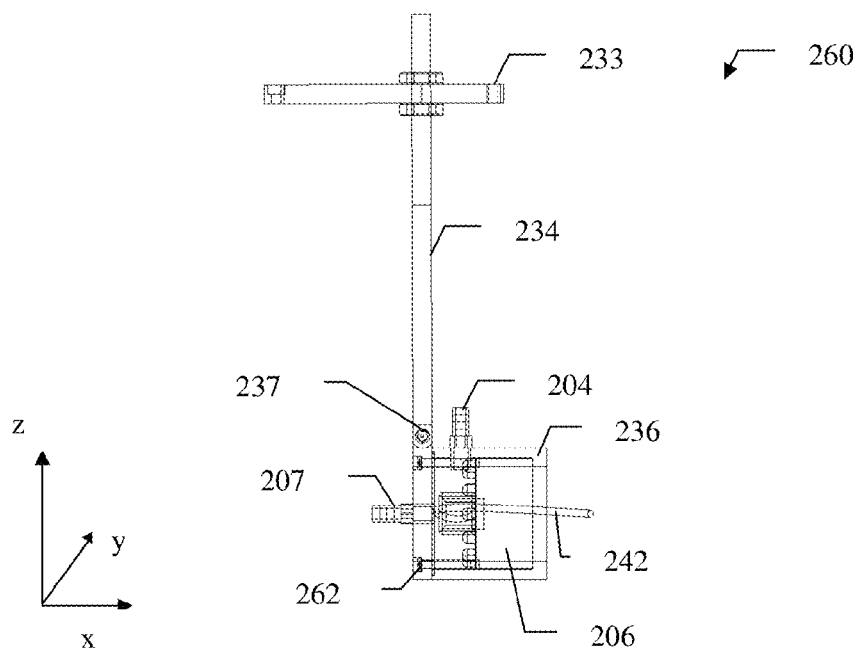
FIG. 2I depicts a side view of an actuator and its supporting components according to FIG. 2G.

FIGS. 2G, 2H and 2I illustrate another embodiment of the coolant activation assembly 108 for installation on a grinding machine for cooling workpiece in a grinding process. As shown in FIG. 2G, the actuator assembly 108 includes six actuators 206. Each actuator 206 is incorporated into a housing 236, which is in turn attached to one end of a vertical arm 234. The other end of the vertical arm 234 is attached to a screw bolt that allows arm 234 to be affixed to a horizontal arm 233 through a slot 235 and a screw nut 232.

As shown in FIG. 2I, the vertical arm 234 can be screwed up or down along the vertical direction (i.e., y direction) to adjust the vertical position of the actuator 206. In addition, the horizontal position (i.e., z direction) of the actuator 206 can be adjusted by moving the horizontal arm 234 in slot 235 of the horizontal arm 233. The actuator housing 236 is attached to the vertical arm 234 through a pivot point 237 that allows the yaw angle of the actuator to be adjusted.

FIG. 2G further shows that the horizontal arm 233 is attached to a center plate 238 through a pivot point 239 that allows the horizontal arm 233 to be rotated, thereby adjusting the oriental of the actuator 206. The center plate 238 has a shape suitable for installation on a machine such as a grinding machine or a milling machine.

FIGS. 2G and 2I further show that each actuator 206 has a power connection 242 for supplying electrical power to the actuator, a coolant inlet 204 for receiving coolant from the coolant supply 101, and a coolant outlet 207 for forming a coolant stream. During the assembling and installation, the vertical position, the horizontal position, and the yaw angle of each actuator 206 are adjusted so that the coolant streams output from the coolant outlet 207 converge at the focal point.

FIG. 2H illustrates the coolant activation assembly depicted in FIG. 2G in its installation position with respect to a grinding machine 245.

According to some other embodiments, the actuator assembly is not limited to the structure depicted in FIGS. 2A, 2G, 2H, and 2I. The actuator assembly 108 can include any number of actuators and take any shape; as long as the coolant streams 208 generated by these actuators converge at a focal point in the working zone.

For example, FIG. 2B shows an alternative embodiment of the actuator assembly 118 having six actuators 206 arranged on a line 215. Each actuator 206 is oriented so that the coolant streams 208 converge at the focal point 214.

FIG. 2C depicts still another embodiment of the actuator assembly 118 having five actuators 206 arranged in a horizontal plane 218 that passes through the focal point 214. The figure shows a view of the assembly from the back of the center actuator toward the focal point 214, which is blocked by the center actuator in this view.

FIG. 2D depicts still another embodiment of the actuator assembly 118 having five actuator 206 arranged in a vertical plane 219. Similar to FIG. 2C, all of the five actuators 206 are oriented so that the coolant streams form a focal point 214 within the plane 219, which is also block by the center actuator in this view.

FIG. 2E depicts still another embodiment of the actuator assembly 118 having five actuator 206 arranged in an oblique plane 220 that form an angle θ with the horizontal plane 218. Similarly, all of the coolant streams reside in the plane 220 that passes through the focal point 214.

FIG. 2F depicts still another embodiment of the actuator assembly 118 having four actuators 206 arranged on a spherical surface 220. Similar to those described above, the actuators 206 are oriented so that the coolant streams 208 form a focal point 214.

As discussed above, one skill in the art will readily recognized that other arrangements of the actuators are possible so long as the coolant streams converge at a focal point and the vibration components carried by the coolant streams have substantially similar strength at the focal point. One skill in the art will further recognize that the distnace between each of the coolant outlets and the focal may or may not be similar and the initial strength of the vibration component can be adjusted so that all of the vibration components have substantially similar strength.

Figure 3A:
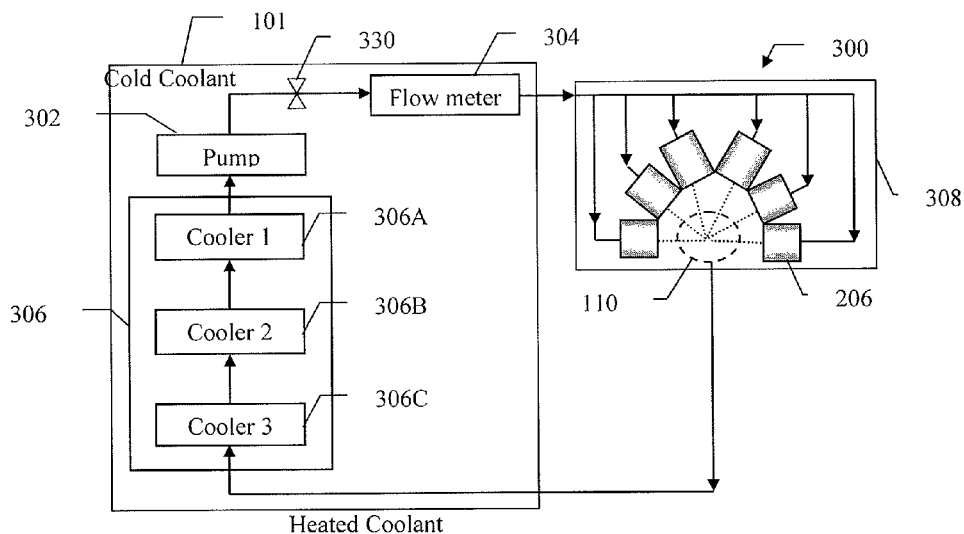
FIG. 3A depicts a cooling system utilizing multi-level cooling and activation coolant.

Now turning to FIG. 3A, depicted therein is another embodiment of a system for providing enhanced cooling to a machining process. Similar to system 100, system 300 utilizes active cooling and activated coolant techniques. In particular, system 300 includes a coolant activation assembly 308 similar to that depicted in FIGS. 2A-I. In addition, system 300 utilizes a multi-level cooling device 306 for providing enhanced cooling.

The multi-level cooling device 306 includes a plurality of coolers 306A-C connected in series for providing various stage of cooling. As the heated coolant returned from the working zone 110 passes through the plurality of coolers, the heat is extracted from the coolant. The system 300 further includes a valve 330 for controlling the coolant flow rate provided to the coolant activation assembly 308.

As discussed above, one application of the systems depicted in FIGS. 1-3 is for providing cooling in a precision machining process such as grinding. As shown in FIGS. 1-3, to achieve better workpiece quality, a number of cooling medium activation units are used for generating multiple coolant streams.

The heated cooling medium (i.e., coolant) collecting from the working zone is pumped into a cooling device 106 or 306. The cooling device utilizes forced convection to cool the heated medium. The temperature can be measured by using a temperature sensor for monitoring and controlling purposes. The medium temperature can be controlled by using a controller or by switching the pump 102 or 302 on or off.

As shown in FIG. 2A-I, multiple actuators can be control independently to provide adjustable cooling. Due to the pressure generated by the pump and by the activation element (i.e. actuator), the cooled and activated medium is ejected by each actuator at a velocity to form a cooling medium stream. For multiple activation units, a number of cooled and activated medium streams are formed.

In order to provide enhanced cooling, the positions of the activation units can be adjusted to allow all of the cooling medium streams to form a focal point so as to jointly affect the area of interest within the working zone 110. The adjustment can be realized through a number of suitable adjustable fixtures that adjust the positions and orientations of the activation units as shown in FIG. 2G-I.

The area of interest is typically the area where significant heat is generated during a machining or chemical process. In general machining processes, this area is the one where materials are removed. In a grinding process, this area is called contact point or grinding zone. The focal point formed by the multiple cooling medium streams resides within the area of interest when the coolant activation assembly is corrected installed on the machine.

As shown in FIGS. 2A-I, the actuators are arranged to activate the cooling medium and direct the cold and activated cooling medium to the focal point. The actuators are attached or integrated in a supporting structure similar to that shown in FIGS. 2G-I, which allows each actuator to be independently adjusted.

After leaving the coolant outlet of an actuator, a cold and activated medium stream travels in the open space at a velocity which is determined by the momentum of the cooling medium stream. When the initial velocity is in a horizontal direction, the height of the streams drops due to the gravitational force, as the streams travel further away from the coolant outlets. Consequently, each activated coolant stream has a maximum traveling distance in the open space, beyond which the coolant stream loses its momentum and the cooling strength is substantially decreased. The maximum traveling distance of a cold and activated medium stream depends on the pressure generated by the pump and the strength of the ultrasonic or megasonic activation provided by each actuator. In order to achieve optimal cooling strength, the actuators should be located close to the focal point so as to provide a stream travel distance shorter than the maximum travel distance.

According to a further embodiment, when a plurality of actuators are used to generate the coolant streams, each actuator can be controlled independently. For example, one or more actuators can be turned off so that fewer streams are generated when less cooling is needed. On the other hand, when the heat continues to accumulate within the working zone and more cooling is needed to maintain the optimal cooling, additional actuators can be engaged to generate more coolant streams, thereby increasing the cooling strength. In this case, the number of medium streams may be different from the number of actuators. As a result, the cooling strength can be adjusted by increasing or decreasing the number of coolant beams to optimize for each process.

Figure 3B:
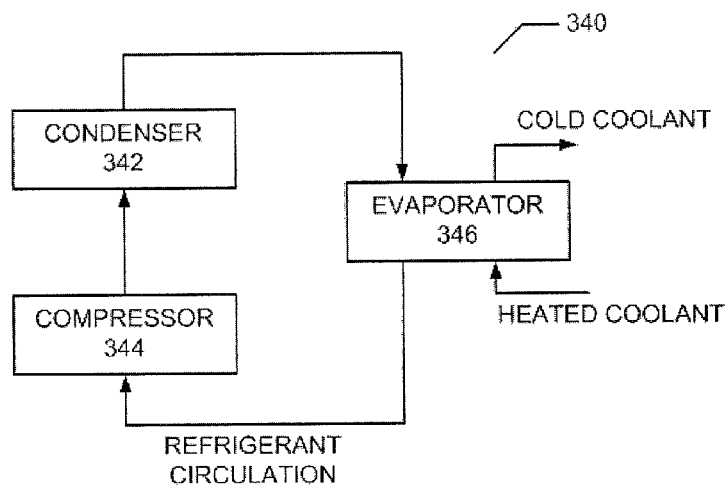
FIG. 3B depicts a diagram of an active cooling system.

According to another embodiment as depicted in FIG. 3B, each of the coolers 106 and 306A-C can be replaced with an active cooling system 340 similar to those described in Y. Gao et al. "An active coolant cooling system for applications in surface grinding," Applied Thermal Engineering, Vol. 23, No. 5, pp. 523-537, 2003; Y. Gao et al. "Effects of actively cooled coolant for grinding brittle materials," Key Engineering Materials, Vol. 291-292, pp. 233-238, 2005; and Y. Gao et al. "Effects of actively cooled coolant for grinding ductile materials," Key Engineering Materials, Vol. 339, pp. 427-433, 2007, all of which are hereby incorporated by reference in their entireties and for everything they describe.

Specifically, the active cooling system 340 receives the heated coolant returned from the working zone and passes it through an evaporator 346, which uses an internal refrigerant circulation to extract the heat from the coolant. The internal refrigerant circulation of the active cooling system 340 additionally includes a compressor 344 and a condenser 342. Compared with the coolers 106 and 306A-C, the active cooling system 340 can provide cold coolant with a steady low temperature even when the temperature of the heated coolant fluctuates.

In the cooling system described above, either gas or fluid can be used as the cooling medium or coolant, provided that suitable actuators are used to activate the coolant. Activation can be realized by imparting ultrasonic or megasonic waves (i.e., vibrations) onto the cooling medium such as air, water, or oil-based coolant.

It should be readily understood by one skilled in the art that the cooling strength of the above-described system is determined in part by the number of coolant streams forming the focal point, the stream traveling distance from the coolant outlet to the focal point, and the coolant temperature. In order to demonstrate the effectiveness of systems 100 and 300, a number of experiments are carried out. In addition, due to the differences in machine characteristics and in materials, suitable values of the parameters must be determined through a number of experiments to choose the parameter values that give the best results. Diagrams of these testing systems are depicted in FIGS. 4-5 and their results are shown in FIGS. 6-18.

Figure 4:
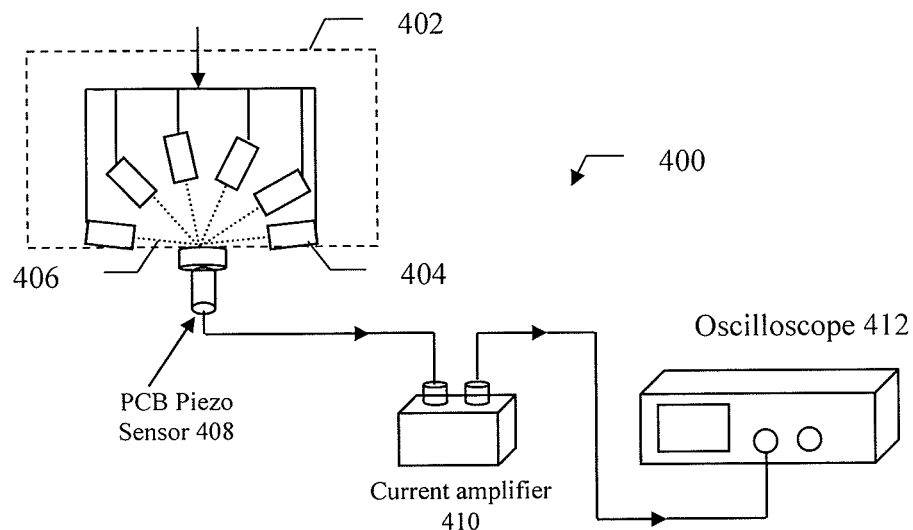
FIG. 4 depicts a testing system for verifying the enhanced vibration at the focal point of the actuator assembly.

Specifically, FIG. 4 depicts the diagram of a system 400 for testing the cooling effect provided by the active cooling and activated coolant. The testing system 400 includes a PCB piezo sensor 408, a current amplifier 410, and an oscilloscope 412. The PCB piezo sensor 408, which is installed at the focal point of an actuator assembly 402, detects the aggregated vibration at the focal point resulting from the converging activated coolant streams 406 and converts the mechanical vibration into electronic signals. The resulting electronic signals, when amplified by the current amplifier 410, can be visualized and measured by the oscilloscope 412.

Similar to that in FIG. 2A, the actuator assembly 402 includes six independently controlled actuators for generating the coolant streams 406. Because the cooling strength provided by the systems 100 and 300 is determined in part by the vibration amplitude (A) of the vibration component carried in the coolant streams, which in turn is determined in part by the number of coolant streams ($n_a$) and the stream travel distance (i.e., ejection distance $d_e$), one of the objective of the experiment is to demonstrates the effects of the number of streams ($n_a$) and the ejection distance $d_e$ on the vibration amplitude A. Therefore, during the experiments, the number of coolant streams $n_a$ and the ejection distance $d_e$ are adjusted, while the vibration amplitude A is measured.

Figure 5:
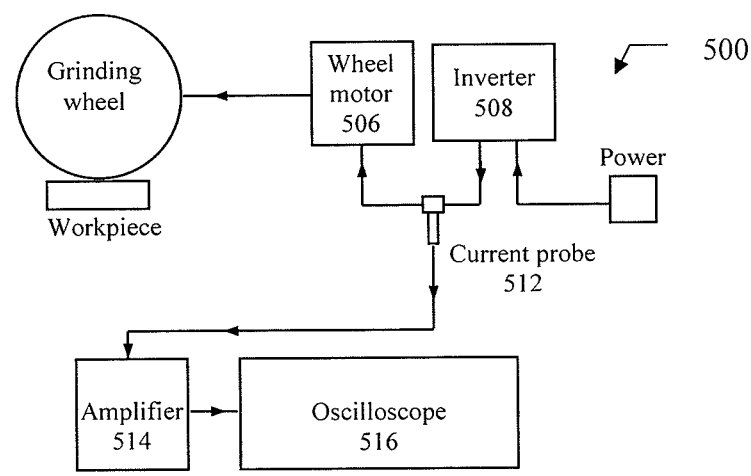
FIG. 5 depicts another testing system for verifying the enhanced cooling effect in a grinding process.

Another testing system 500 shown in FIG. 5 utilizes a grinding operation performed on a grinding machine to demonstrate the effectiveness of the active cooling and activated coolant systems 100 and 300. As depicted in FIG. 5, the testing system 500 includes a current probe 512, an amplifier 514, and an oscilloscope 516. The current probe 512 is used to tap into the wire connecting the wheel motor 506 and the inverter 508 to collect the wheel current signal I, which is amplified by the amplifier 514 and then visualized and measured by the oscilloscope 516.

Because the load current I and the workpiece surface roughness are directly determined by the machining force, which in turn is determined by the cooling strength, the load current I, the workpiece surface roughness Ra, and surface morphology are recorded during the experiment, and their relationship with the number of coolant streams na and the coolant temperature tc are demonstrated in FIGS. 8-18.

The experimental conditions and the data measured from the experiments depicted in FIGS. 4 and 5 are shown in FIGS. 19 and 20.

As the experimental results in FIGS. 23-28 and FIGS. 6-18 demonstrate, the cooling systems and methods described above is more effective and advantageous than existing systems, in that it provides an enhanced cooling effect that can be adjusted and optimized by simply increasing or decreasing the number of coolant streams used to form the focal point. At the same time, because a large vibration amplitude can be generated by aggregating a plurality of coolant streams with relatively weak vibrations, the requirements on the system components are lowered and costs are reduced. In some extreme cases, a vibration amplitude that exceeds the limits of individual actuators can be generated, without causing stress or damage to the system components.

Figure 6:
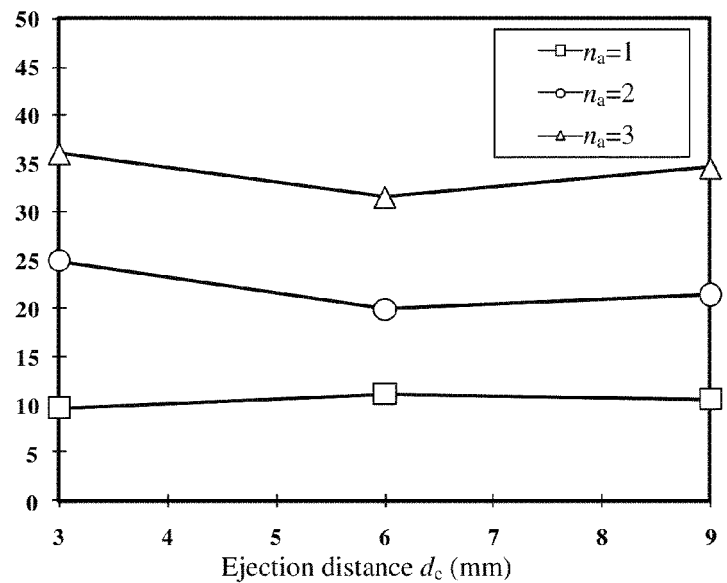
FIG. 6 depicts testing results showing a relationship between vibration amplitude and ejection distance.
Figure 7:
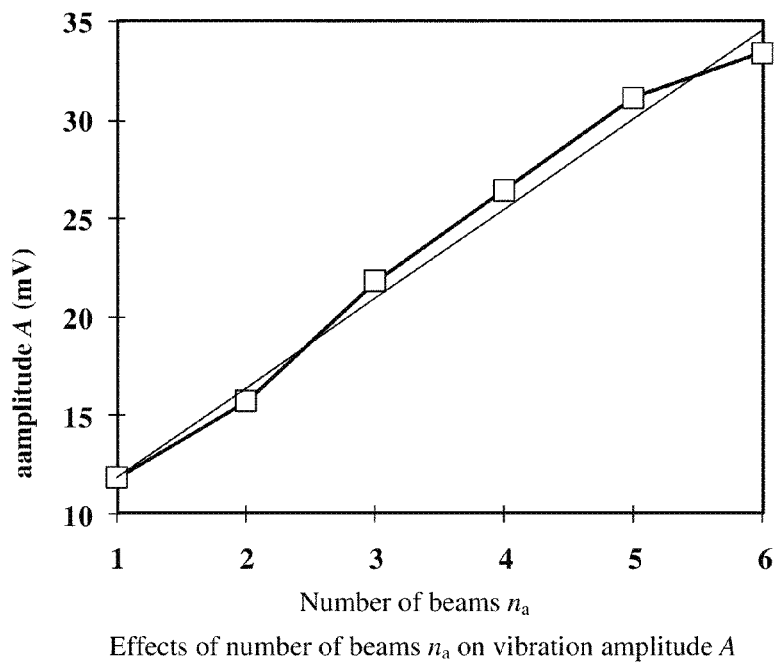
FIG. 7 depicts the relationship between the vibration amplitude and the number of coolant streams.

FIGS. 6-7 illustrate the experimental results showing the vibration amplitude A as a function of the ejections distance de (FIG. 6) and as a function of the number of streams na (FIG. 7). As seen in FIG. 6, as the ejection distance de is increased from 3 to 9 mm, the vibration amplitude A remains stable. On the other hand, FIG. 7 shows that the vibration amplitude A increases nearly linearly with the number of coolant streams na.

Figure 8:
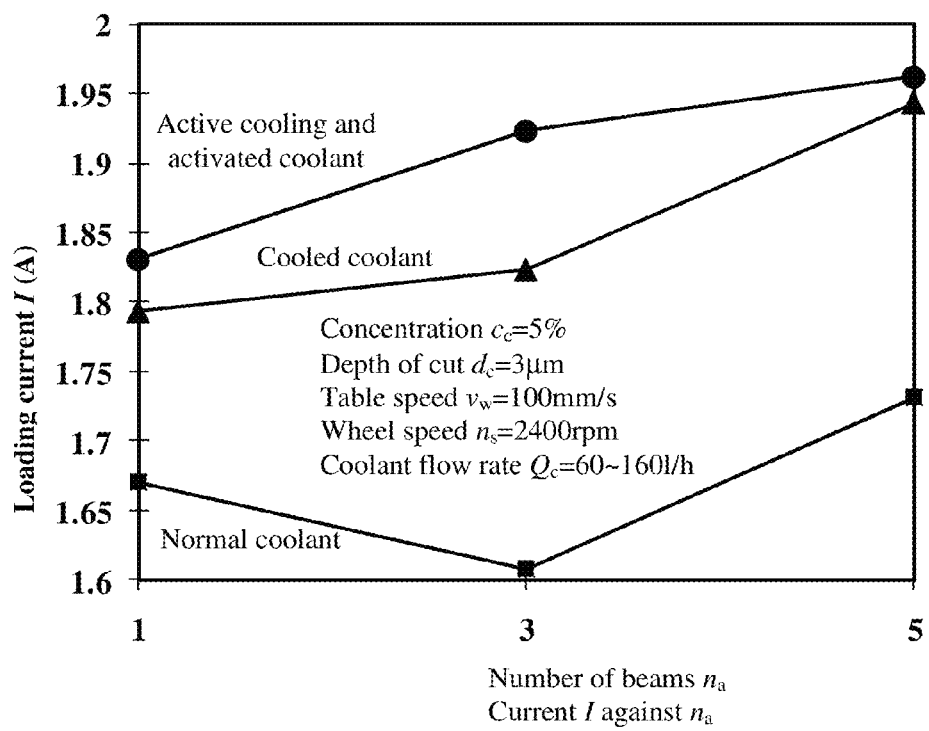
FIG. 8 depicts the relationship between the loading current and the number of coolant streams.
Figure 9:
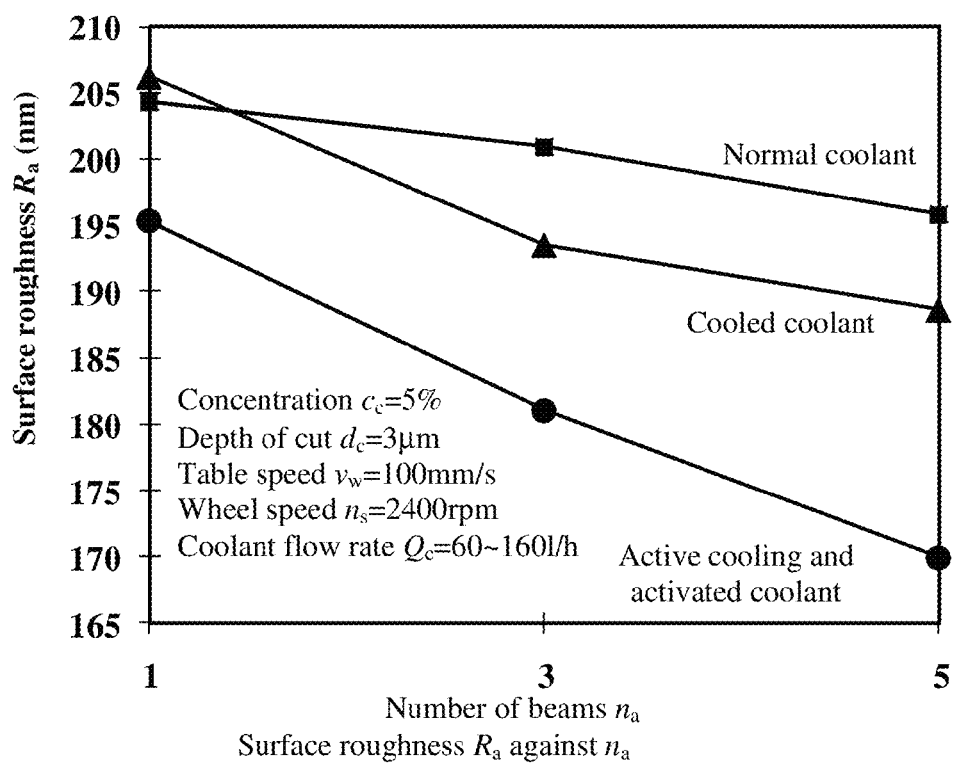
FIG. 9 depicts the relationship between the surface roughness and the number of coolant streams.

FIG. 8 shows that both active cooling and activated coolant increases the effectiveness of the machining process as the current, so as the force, is increased. It also shows that using more coolant streams further increases the effectiveness. FIG. 9 shows similar effectiveness, where the surface roughness of the workpiece is decreased when more coolant streams are applied to the grinding process and/or when both the active cooling and activated coolant are utilized.

Figure 10:
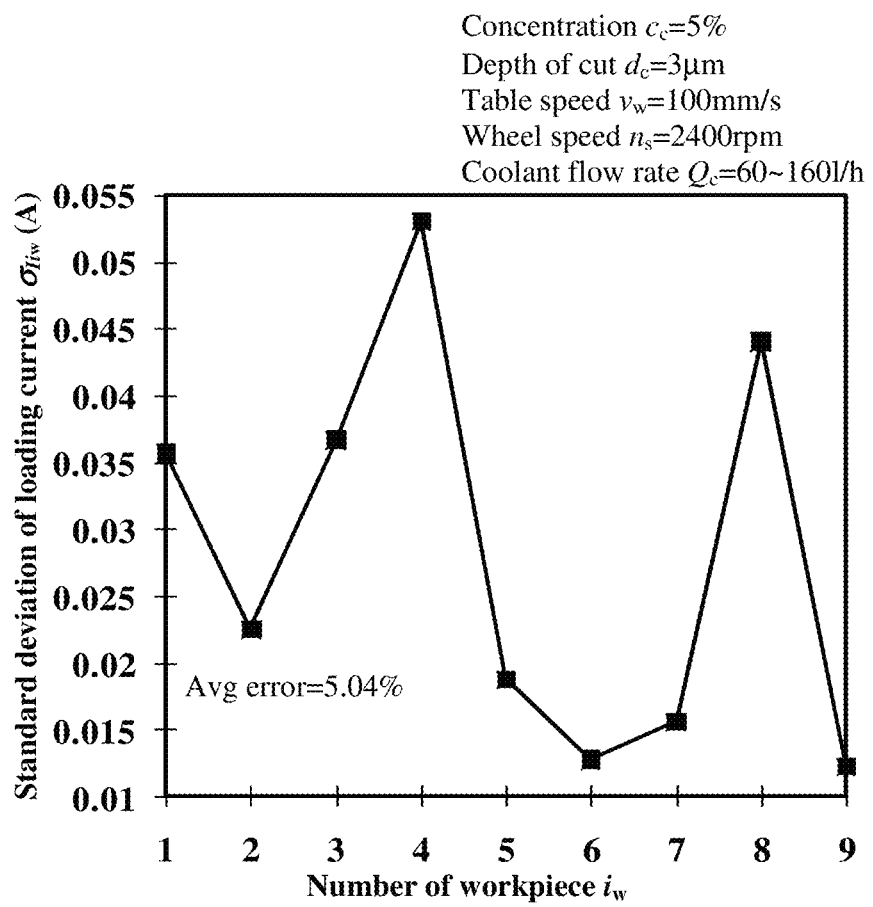
FIG. 10 depicts the relationship between the standard deviation of loading current and the number of workpieces obtained from the experiment shown in FIG. 8.
Figure 11:
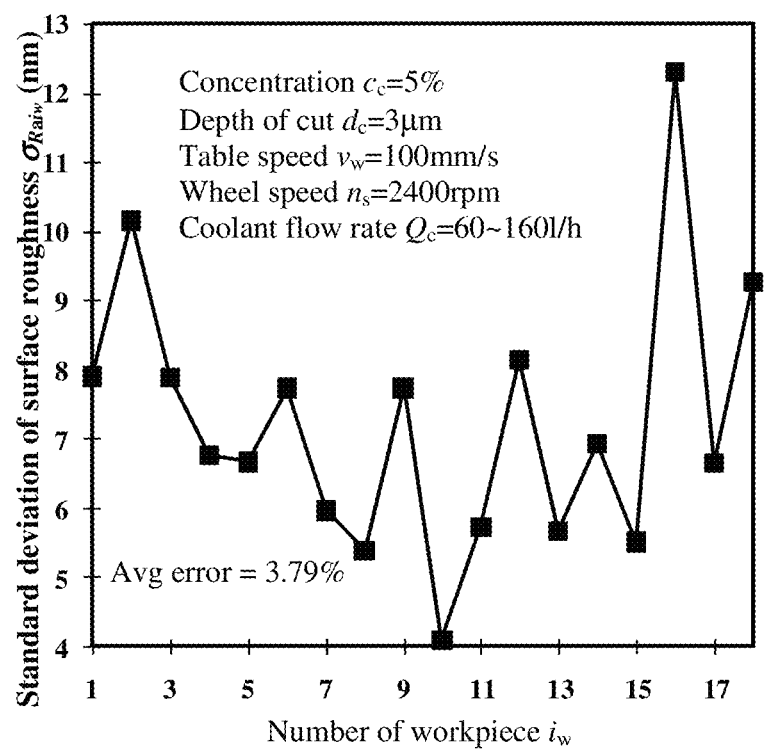
FIG. 11 depicts the relationship between the standard deviation of surface roughness and the number of workpieces obtained from experiment shown in FIG. 8.
Figure 12:
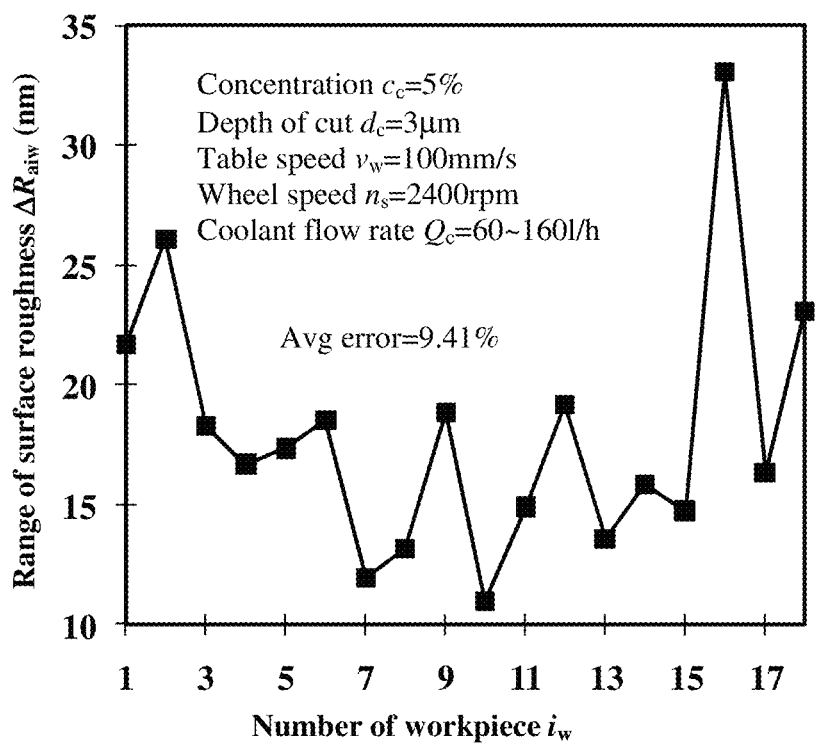
FIG. 12 depicts the relationship between the range of surface roughness and the number of workpieces obtained from the experiment shown in FIG. 8.

FIGS. 10-12 show that the average variation of the results is approximately 3-5% for standard deviation and approximately 10% for individual measurement result. This shows that multiple measurement points and averaging are necessary as demonstrated in FIG. 20. These data demonstrates that the results are stable and thus reliable.

Figure 13:
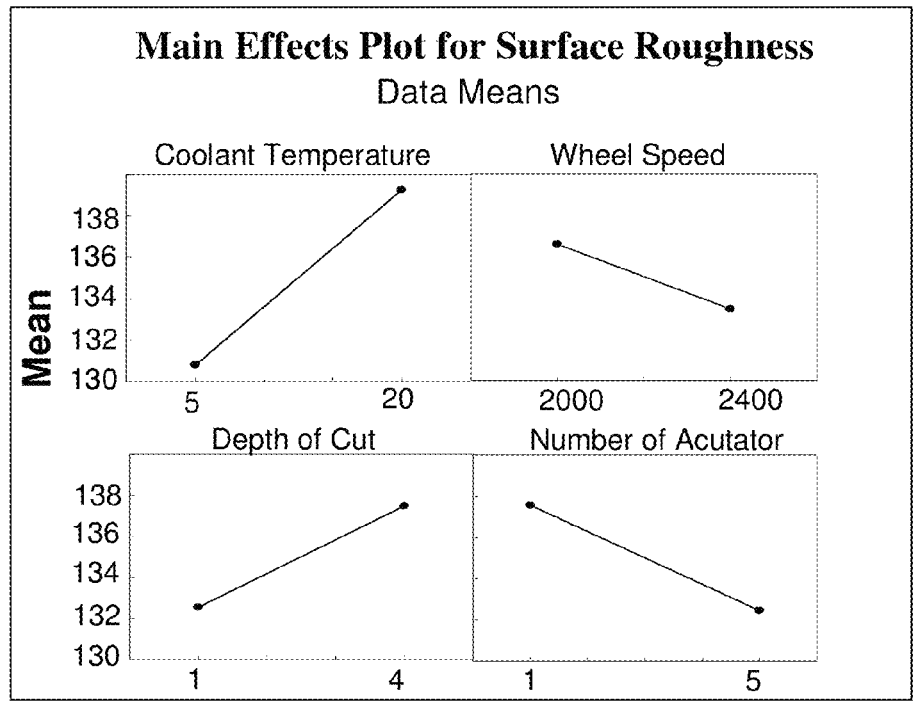
FIG. 13 depicts the main effects for surface roughness.
Figure 14:
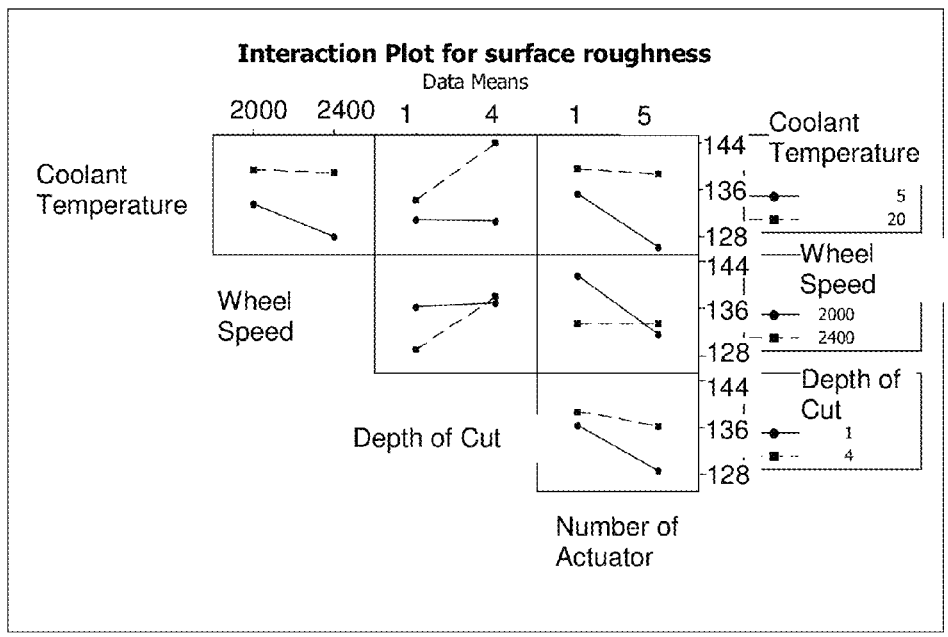
FIG. 14 depicts the interaction for surface roughness.

The results showing the coolant temperature tc, wheel speed ns, depth of cut dc, and number of coolant streams na are further listed in FIGS. 21-22 and depicted in FIGS. 13-14.

Figure 15:
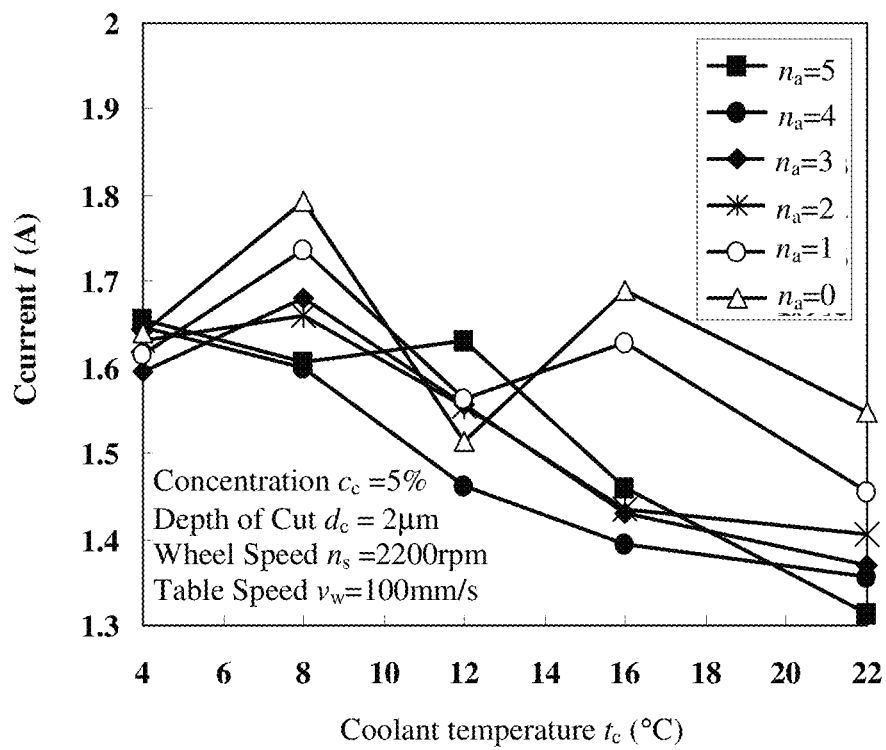
FIG. 15 depicts the effects of coolant temperature on the loading current.
Figure 17:
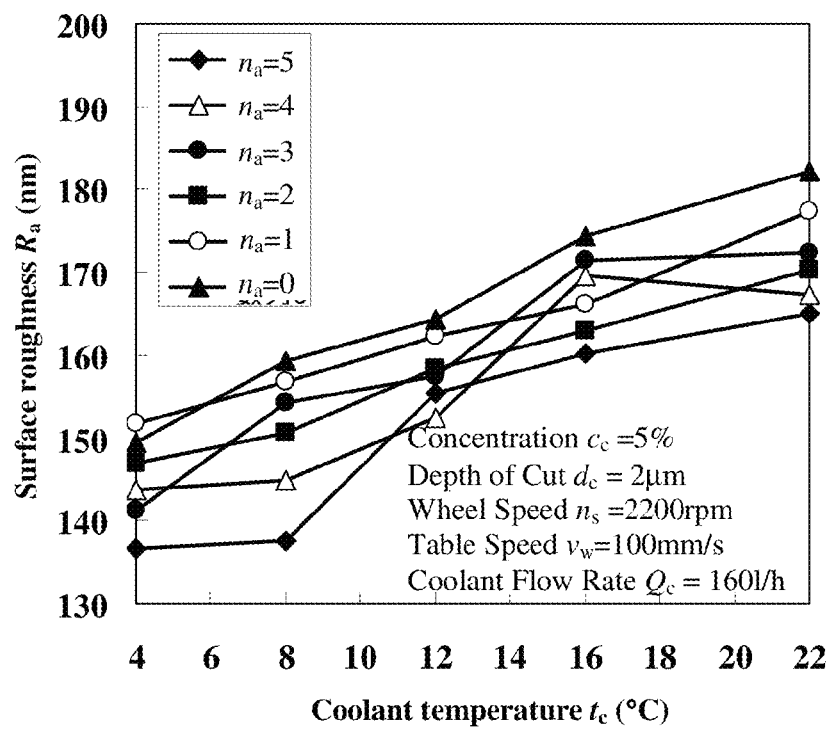
FIG. 17 depicts the effects of coolant temperature on surface roughness.

As further shown in FIGS. 15 and 23, by using active cooling and multiple coolant streams, the machining effectiveness in terms of loading current, which is related to machining force, increases up to 20.66%. In terms of surface roughness, the improvement is up to 22.04%, as shown in FIGS. 17 and 25.

Figure 16:
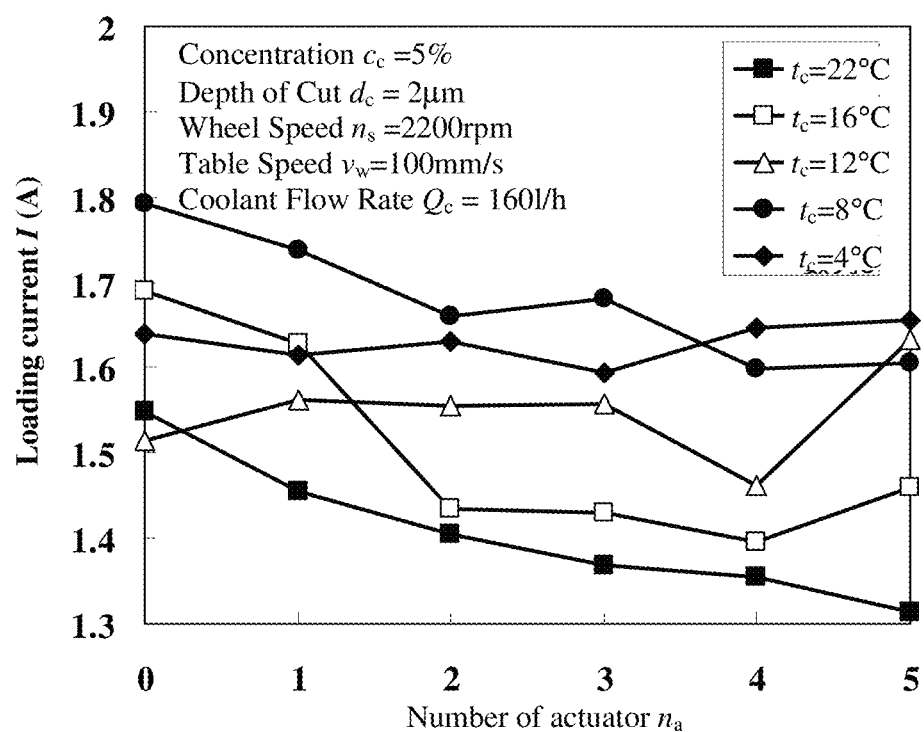
FIG. 16 depicts the effects of number of coolant streams on the loading current.
Figure 18:
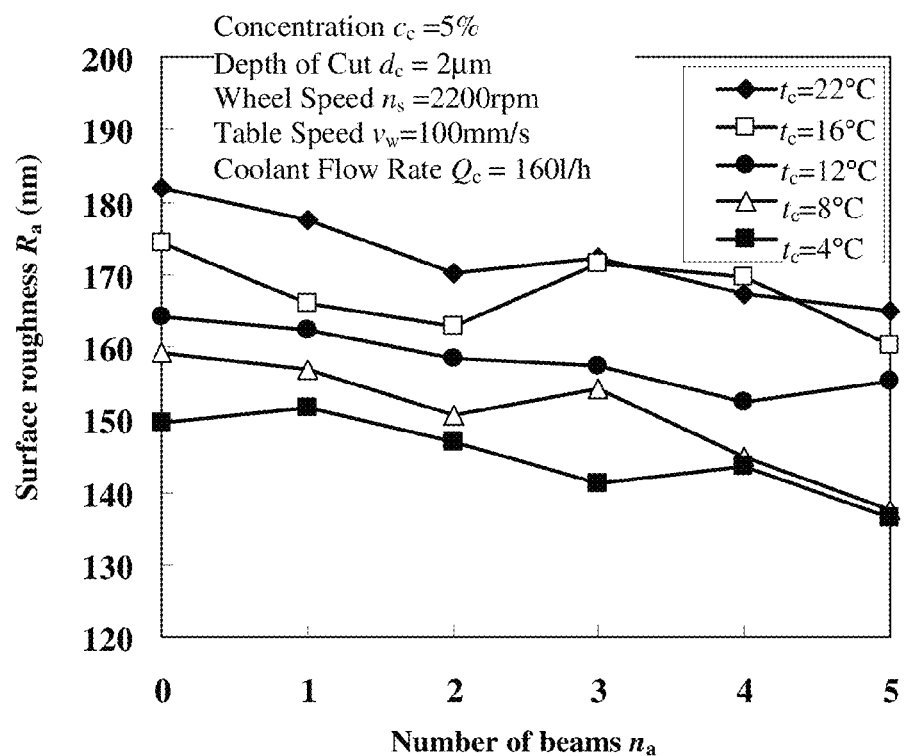
FIG. 18 depicts the effects of number of coolant streams on surface roughness.

FIGS. 16 and 24 show that, compared with the single coolant stream approach, in terms of current that is related to machining force, a further improvement of approximately 10.35% is achieved by using the multi-streams coolant activation assembly having six actuators. FIGS. 18 and 26 show that, in terms of surface roughness, a further improvement of approximately 12.3% is achieved by the multi-streams coolant activation assembly having six actuators.

FIGS. 25-28 further show various results when the active cooling temperature $tc \leq 8°$ C. and the number of activated streams $na \geq 3$.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for providing cooling in a machining process, the system comprising:
   a coolant supply, configured to provide coolant to a coolant activation assembly, and
   the coolant activation assembly, including a plurality of piezoelectric actuators, wherein each of the plurality of piezoelectric actuators is configured to emit a respective coolant stream and to impart an ultrasonic or megasonic vibration component to the respective coolant stream;
   wherein the plurality of piezoelectric actuators is configured to provide cooling to a single focal point in a work zone by directing multiple coolant streams emitted by the plurality of piezoelectric actuators to the single focal point such that the multiple coolant streams converge at the single focal point.

2. The system of claim 1, wherein the single focal point is within a cutting zone formed between a workpiece and a cutting tool.

3. The system of claim 1, wherein the coolant supply further comprises:
   a flow meter; and
   a cooling system for cooling coolant returned from the work zone.

4. The system of claim 3, wherein the cooling system further includes: an evaporator, a compressor, and a condenser.

5. The system of claim 3, wherein the cooling system further comprises:
   a pump for driving the returned coolant through the cooling system and for forming a coolant flow provided to the coolant activation assembly; and,
   one or more coolers for extracting heat from the returned coolant.

6. The system of claim 5, wherein the pump and the one or more coolers are connected in series.

7. The system of claim 5, wherein each of the one or more coolers further includes: an evaporator, a compressor, and a condenser.

8. The system of claim 1, wherein each of the plurality of piezoelectric actuators is positioned at substantially the same distance from the single focal point.

9. The system of claim 8, wherein the plurality of piezoelectric actuators are positioned such that the plurality of piezoelectric actuators form a spherical shape centered around the single focal point.

10. The system of claim 8, wherein the plurality of piezoelectric actuators are positioned such that the plurality of piezoelectric actuators encircle the single focal point.

11. The system of claim 10, wherein the plurality of piezoelectric actuators and the single focal point are aligned in a single plane.

12. A method for cooling a work zone in a machining process, comprising:
    receiving, at a coolant activation assembly, coolant from a coolant supply; and
    activating a plurality of piezoelectric actuators in the coolant activation assembly to generate a plurality of coolant streams, each coolant stream being imparted with an ultrasonic or megasonic vibration component, wherein the plurality of coolant streams are directed to a single focal point in the work zone such that the plurality of coolant streams converges at the single focal point.

13. The method of claim 12, further comprising:
    collecting coolant from the work zone and cooling the collected coolant via a cooling system; and,
    pumping, via a pump of the cooling system, the cooled collected coolant to the coolant activation assembly.

* * * * *